United States Patent
Venturelli et al.

(10) Patent No.: US 10,691,771 B2
(45) Date of Patent: Jun. 23, 2020

(54) SYSTEM AND METHOD TO HARDCODE INTERGER LINEAR OPTIMIZATION PROBLEMS ON PHYSICAL IMPLEMENTATIONS OF THE ISING MODEL

(71) Applicant: Universities Space Research Association, Mountain View, CA (US)

(72) Inventors: Davide Venturelli, Moffett Field, CA (US); Immanuel Trummer, Ithaca, NY (US)

(73) Assignees: UNIVERSITIES SPACE RESEARCH ASSOCIATION, Columbia, MD (US); CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 15/920,436

(22) Filed: Mar. 13, 2018

(65) Prior Publication Data

US 2019/0087388 A1    Mar. 21, 2019

Related U.S. Application Data

(60) Provisional application No. 62/470,483, filed on Mar. 13, 2017.

(51) Int. Cl.
  *G06F 17/11*    (2006.01)
  *G06N 10/00*    (2019.01)
  *G06N 5/00*     (2006.01)

(52) U.S. Cl.
  CPC ............. *G06F 17/11* (2013.01); *G06N 5/003* (2013.01); *G06N 10/00* (2019.01)

(58) Field of Classification Search
  CPC ...................................................... G06F 17/11
  See application file for complete search history.

(56) References Cited

U.S. PATENT DOCUMENTS

| | | | |
|---|---|---|---|
| 2007/0174227 A1* | 7/2007 | Johnson | G06N 10/00 706/62 |
| 2008/0065573 A1* | 3/2008 | Macready | G06N 7/08 706/19 |
| 2008/0086438 A1 | 4/2008 | Amin et al. | |
| 2014/0324933 A1 | 10/2014 | Macready et al. | |

(Continued)

OTHER PUBLICATIONS

Cao et al. "Solving Set Cover with Pairs Problem using Quantum Annealing." Scientific Reports. vol. 6, Article No. 33957. Sep. 27, 2016.

(Continued)

*Primary Examiner* — Chuong D Ngo
(74) *Attorney, Agent, or Firm* — Whiteford, Taylor & Preston, LLP; Peter J. Davis

(57) ABSTRACT

Systems and methods for allowing analog Ising machines to be able to run Integer Linear Programming ("ILP") problems, i.e. a compilation method for setting the state of the physical memory units, flexible to be adapted to each specific device. The method describes how variables and numeric parameters which specify the problem can be hard-coded (embedded and physically represented) in the hardware circuitry of the device in a deterministic way, with a pre-determined bound on the number of required physical spins to be used in the Ising device.

13 Claims, 5 Drawing Sheets

(56) References Cited

U.S. PATENT DOCUMENTS

2015/0205759 A1* 7/2015 Israel .................... G06N 10/00
                                                    703/2
2016/0071021 A1* 3/2016 Raymond ............... G06F 15/76
                                                    712/28

OTHER PUBLICATIONS

Molkaraie. "The Primal versus the Dual Ising Model." Cornell University Library, Computer Science, Information Theory. Jan. 3, 2017.
International Search Report issued in co-pending International Application No. PCT/US2018/022271 dated Jun. 27, 2018.

* cited by examiner

SYSTEM AND METHOD TO HARDCODE INTERGER LINEAR OPTIMIZATION PROBLEMS ON PHYSICAL IMPLEMENTATIONS OF THE ISING MODEL

CROSS-REFERENCE TO RELATED APPLICATION

This application claims the benefit of U.S. Provisional Patent Application No. 62/470,483 entitled "System and Method to Hard-Code Integer Linear Optimization Problems on Physical Implementations of the Ising Model," filed Mar. 13, 2017, the specification of which is hereby incorporated by reference in its entirety.

BACKGROUND OF THE INVENTION

Field of the Invention

The present invention relates to a method and system for analog Ising machines to be able to run Integer Linear Programming ("ILP") problems.

Description of the Background

A large part of the interesting combinatorial optimization problems can be cast into hard to solve ILP problems; asset allocation, multi-dimensional knapsacks, route optimization, network transmission, scheduling problems are among those ILP problems proven to be NP-hard.

The ILP problems can be cast in the form:

$$\min\left[\sum_{i=1}^{N} \gamma_i x_i\right]; \sum_{i=1}^{N} \mathbb{A}_i^{[c]} x_i \leq \kappa^{[c]} \ \forall \ c$$

where $\gamma$, A and $\kappa$ are real or integer numbers. The first term is the objective function, the second terms are the constraints of the problem, and xi are the bits associated to the Ising spins $s\neg_i$ through the transformation $x=\frac{1}{2}(s+1)$.

Each constraint can represented as a penalty function in the Ising (or quadratic optimization) formalism—i.e. by the introduction of slack variables (i.e. additional bits) an quadratic function in the variables can be created in such a way that its minimum value (typically =0) appears only when the inequality constraints are respected.

All of these problems can be formulated as an Ising optimization problem (equivalent to a quadratic optimization problem) suitable for enabling the use of Physical Ising Machines to find efficient solutions for these problems. The Physical Ising Machine developed by D-Wave Systems can be considered one embodiment of such a machine, since it implements the quantum annealing protocol (see W. M. Kaminsky and S. Lloyd, Quantum Computing and Quantum Bits in Mesoscopic Systems, Springer, 229-236 (2004) and M. W. Johnson et al., Quantum annealing with manufactured spins, Nature 473, 194 (2011)). Other Physical Ising Machines are the ones under development by Google Inc., the IARPA QEO program, Stanford University and NTT; or Fujitsu.

In all the machine designs cited above, the objective function to be extremized is casted into an Ising form:

$$\sum_{ij} J_{ij} s_i s_j + \sum_i h_i s_i$$

where $s_i$ are the spin (+1/−1) variables and the J and h are matrices and vectors containing the parameters of the problem. The Ising form is what it is typically hard-coded in the machine. While the $J_{ij}$, $h_i$ parameters could in principle be real numbers, due to the analog nature of the machine, a limited precision is imposed, limiting applications to either problems robust to misspecification noise (e.g. some machine learning approaches) or ILP.

Indeed, if the parameters are integer numbers, the Ising form is essentially equivalent to the NP-Hard Integer Linear Programming (ILP).

It is however common for many Physical Ising Machines to impose additional limitation on the $J_{ij}$ coefficients, which are required to be zero if the i and j spins do not lie along the edges of a specific architecture-dependent hardware graph.

This restriction is currently considered the most severe programming limitation of solid-state Physical Ising Machines architectures, and it has attracted considerable attention since the very beginning of research in design of quantum annealers. The limitation is mostly due to the the fact that the hardware is typically required to be a quasi-planar sparse graph, while the non-zero parameters $J_{ij}$ of an interesting problem is likely to define an adjacency matrix of a logical graph with much denser degree distribution requirements.

The mainstream solution to the problem is to perform a compilation of the Ising problem into the machine hardware, which essentially results into a new objective function compatible with the hardware graph whose global minimum could be straightforwardly associated to the solution of the ILP (Embedded Ising Hamiltonian).

In previous work, solving a quadratic binary optimization problem using a physical Ising annealer typically requires representing the graph representing the given quadratic binary optimization problem, and the machine architecture hardware graph. The graph representing the given quadratic binary optimization problem, corresponding to the non-zero $J_{ij}$ terms, is referred to as the input graph. In the process of solving the given quadratic binary optimization problem using the physical Ising machine, the input graph is embedded into the target graph. This means that the input graph is mapped to the hardware graph.

In general, efficient minor-graph embedding itself is an NP-hard problem; as the size of the graphs increases, the general problem of finding an embedding can become very computationally expensive. As a result, the most widely used embedding algorithms are heuristic in nature, sacrificing embedding quality with respect to chain length, number of qubits, etc., and success probability in order to achieve polynomial running times.

There is a need for a method and a system that will replace the embedding procedure by directly hard-coding the ILP into the target graph of the Physical Ising Machine.

Features of the invention will be apparent from review of the disclosure, drawings and description of the invention below.

SUMMARY OF THE INVENTION

We describe a system to solve integer linear programming problems. The system hardware consists of two connected components, a classical computer and a physical Ising machine. The system takes as input the description of an integer linear program. The output is an optimal or near-optimal solution to the input problem.

The system executes the following high-level steps to solve an integer linear program:
  a. It transforms the input problem into a problem that can be solved on the physical Ising machine.
  b. It maps the problem variables that appear in the transformed problem to spin groups on the physical Ising machine.
  c. It finds optimal or near-optimal solutions to the transformed problem by executing a physical action on the physical Ising machine, e.g., an annealing process.
  d. It transforms solutions to the transformed problem into solutions to the original problem, exploiting the mapping from problem variables to spins.

Step 1 (transformation into a problem that can be solved on the physical Ising machine) might be implemented as follows. We assume that the Physical Ising Machine solves quadratic unconstrained binary optimization (QUBO) problems which are known to be equivalent to Ising problems. Each integer linear program can be represented by a set of linear inequalities or equalities together with a linear function to minimize (the objective function). We first show how the goal of satisfying a single linear inequality can be represented as QUBO problem. For instance, we assume that the linear inequality is of the form $a_1 \cdot x_1 + a_n \cdot x_n$, $\leq u$ where $x_1$ to $x_n$, are n≥1 binary variables, $a_1$ to $a_n$ are n real-valued weights, and u is an integer.

A QUBO problem is characterized by a quadratic formula in binary variables to minimize. Consider the QUBO problem to minimize the formula $$(\Sigma_{i \in \{1,\ldots,n\}}(a_i x_i) - \Sigma_{i \in \{1,\ldots,m\}}(w_i v_i))^2$$

where the weights $a_i$ and the variables $x_i$ are taken from the linear inequality. Additionally, the aforementioned formula contains m binary variables of the form $v_i$ and positive real-valued weights of the form $w_i$. The weights $w_i$ are chosen such that $\Sigma_{i \in \{1,\ldots,m\}}(w_i = u)$, where u denotes the upper bound in the linear inequality. The QUBO problem has the property that each value assignment for the variables $x_1$ to $x_i$, which allows an optimal solution to the QUBO problem (by assigning the variables $v_i$ to optimal values as well) satisfies the linear inequality from before. The QUBO formula reaches its optimal value of zero if and only if the value of the first sum $\Sigma_{i \in \{1,\ldots,n\}}(a_i \cdot x_i)$ matches the value of the second sum $\Sigma_{i \in \{1,\ldots,m\}}(w_i \cdot v_i)$ The latter is however only possible as long as the first term, which is the left-hand side of the linear inequality, is below the upper bound u.

Assume that an integer linear program can be represented by k linear inequalities, $I_1$ to $I_k$, and a linear objective function ƒ We denote by $Q_k$ the quadratic formula representing $I_k$ by the transformation described before. For each $Q_k$, we introduce a new set of auxiliary variables of the form $v_i$ while all formulas $Q_k$ refer to the same set of variables of the form $x_i$. Then the formula ƒ+$\Sigma_{in\{1,\ldots,n\}} Q_K$ is quadratic (i.e., it contains only linear and quadratic terms). Each assignment from variables to values that minimizes this quadratic formula also describes an optimal solution to the aforementioned integer linear program (by considering only the value assignments for the variables $x_i$).

More specifically, we detail a component of an analog computer system meant to implement a procedure for hard-coding Integer-Linear-Programming (ILP) optimization problems on unconventional computing hardware. The system is built for physical Ising machines that are meant to sample the spectrum, or solve for the low-energy configurations, of instances of the classical, disordered Ising model on a specific graph having some regular structure. For instance, the quantum annealing machines manufactured by D-Wave systems allow the programming of Ising Models on a chimera graph (see FIGS. 4 and 5).

The compilation problem arises when the physical representation of target ILP specification, that without loss of generality can be considered a QUBO form as described above, does not fit immediately the graph structure, and require some transformation.

The standard approach to transform the QUBO into an Ising model fitting the hardware graph structure of the machine is based on "minor embedding": a compilation method that is very computationally challenging if the hardware graph is sparse and the available number of variables are constrained. For this reason there is a compelling need for new general methods to hard-code ILP problems into physical machines efficiently and fast. Introducing a component in the Ising machines that could perform well the compilation would be game-changing.

The purpose of the invented component (the "system") is to physically implement specific methods, hereby detailed. For the purpose of clarity in the explanation, the system intermediate output can be represented by a digital memory as a data-structure representing both the layout binary variables on the chip (whether quantum or classical) and the specified QUBO as an ordered sequence of clusters of variables, called ClusterForm, whose properties can be easily indexed, analyzed and represented in simple notation, stored efficiently on digital memory.

The complete hard-coding method in its generality understandable as a modular application of ClusterForm generation, ClusterForm transformation, ClusterForm search and Clusterform compilation methods. All these operations are assisted by a digital memory and digital computer processor until the moment they are hard-coded on the chip.

In the simplest implementation of the system, the QUBO problem becomes associated to a single ClusterForm, while the hardware layout is associated to a finite set of Cluster-Forms, generated and indexed by the algorithms.

Transformation algorithms can be applied to the QUBO ClusterForm, mapping it to a different ClusterForm but guaranteeing that the association to the original problem is still valid. These transformation algorithms are applied iteratively commanded by a search algorithm, in such a way to find a transformation of the original ClusterForm to one of the ClusterForm that are associated to the hardware layout.

Once both the QUBO and the hardware layout are both associated to the same ClusterForm, then the generation of the physical Ising model into the hardware support is straightforwardly obtained by very efficient ClusterForm compilation algorithms.

In some cases, only part of both the QUBO and the Hardware layout is converted ClusterForm at a given step, while the rest of the system is still in its original form. This for instance allows to apply transformation algorithms and search algorithm constructively starting with only the beginning of the program to be compiled in Ising form on the chip and then progressively covering the hardware layout up to the point when all the problem has been hardcoded.

Accordingly, the system object of this invention is a component of the control circuitry of the IM which is capable to execute these described methods in a flexible way, resulting in hard coding the required parameters in a physical representation on the hardware graph. The result can be seen as an embedded Ising model. This physical representation might consist in using the described methods for setting electric or magnetic fields, tuning laser powers, activate electromechanical systems, applying signals in order to generate the correct energy landscape, according to the specific architecture of the Physical Ising Machine. Moreover, this system needs to be able to interact with a memory and be controlled by a conventional digital computer in order to guarantee the application of the methods.

In accordance with an embodiment, the indication of an ILP is obtained (for instance in canonical or normal form) from one of a user interacting with the processing device, a memory located in the processing device and a remote processing device operatively connected to the processing device.

According to a broad aspect, there is disclosed a method for solving an ILP problem using a Physical Ising Machine with a specific hardware graph, the method comprising generating an embedding pattern according to the method disclosed herein and solving the ILP problem by hardcoding on the analog device the embedding pattern generated.

In accordance with an embodiment, the hardware graph has defects such as inoperable spins or precision issues in the physical representation of the $J_{ij}$ coefficients.

According to a broad aspect, there is disclosed a processing device for generating an embedding pattern, the processing device comprising a central processing unit; a display device; a communication port for operatively connecting the processing device to a Physical Ising Machine characterized by an architecture comprising a plurality of blocks, not necessarily equal to each other, each block comprising a plurality of spins; a memory unit comprising an application for generating an embedded Ising Hamiltonian used for solving an ILP, the application comprising instructions for activating the required physical actions on the Physical Ising Machine to represent the $J_{ij}$ and $h_i$ coefficients at sufficient precision; instructions for decomposing the ILP problem into an ordered product of clusters representative of the ILP problem, according to the methods described herein; instructions for assigning the variables in the clusters to the blocks of the architecture of the Physical Ising Machine; further wherein the determined assignment cluster-to-blocks provides a 1-to-1 mapping of the corresponding selected ILP variables in the cluster to corresponding spins in the determined block; further wherein the determined clusters comprises a set of 1-to-1 couplings to another cluster, providing a connection to the corresponding assigned spins; instructions for determining an ordering of the blocks on the hardware architecture graph to be put in correspondence with the ordering of the clusters; instructions for providing an indication of the embedding pattern and a data bus for interconnecting the central processing unit, the display device, the communication port and the memory unit.

According to a broad aspect, there is disclosed a non-transitory computer-readable storage medium for storing computer-executable instructions which, when executed, cause a processing device to perform physical actions on the Physical Ising Machine for generating an embedded Ising Hamiltonian used for solving an ILP using the methods described in this invention disclosure.

According to a broad aspect, there is disclosed a method for generating and hard-coding an embedded Ising Hamiltonian starting from the ILP formulation.

One advantage of the method for generating an embedding pattern disclosed herein is that larger problems may also be hard-coded into a Physical Ising Machine faster than other heuristics methods.

Another advantage of the methods disclosed herein is that a higher success rate may be obtained compared to prior art available heuristic methods for solving an ILP starting from its formulation.

Accordingly, there is provided according to the invention a method for generating an embedding pattern used for solving an ILP using a Physical Ising Machine characterized by an hardware graph architecture comprising a plurality of blocks, each block comprising a plurality of spins, the method including the steps: use of a processing device for: obtaining an indication of an ILP problem to solve using the Physical Ising Machine; wherein the ILP problem is defined using an integer encoding to binary variables, with a linear objective function and a set of inequality or equality constraints; decomposing the ILP into an ordered sequence of clusters representative of the ILP problem; selecting an ordered sequence of adjacent blocks in the hardware graph collectively mapping a subset of the spins in the selected blocks in 1-to-1 correspondence to the ILP binary variables; determining a set of auxiliary spins in each block that are associated to the variables that keep track of the total or partial weighted sum of the one or more constraints in the ILP; further wherein the determined blocks comprises a set of terminals for providing a coupling between the blocks that could be put into 1-to-1 correspondence with the duplicated auxiliary variables in each set of adjacent cluster, two-by-two; and providing an indication of the how to hard-code the embedded Ising Hamiltonian on the selected block structure.

There is further provided according to the invention a method wherein the indication of an ILP problem is obtained from one of a user interacting with the processing device, a memory located in the processing device and a remote processing device operatively connected to the processing device.

There is further provided according to the invention a method wherein the "decomposing of the ILP problem into an ordered sequence of clusters representative of the ILP problem" comprises determining a first cluster K1 and a second cluster K2 such that the variables in each ILP inequality or equality constraints are associated either to K1 or K2, and for each ILP constraint: a new sub-constraint is created where the weighted sum of variables obtained by changing the original constraint formulation by setting all the variables not in K1 to zero, is required to sum to a value equal to an arbitrary weighted sum of newly introduced auxiliary variables, G(1); a new sub-constraint is created where the weighted sum of variables obtained by changing the original constraint formulation by setting all the variables not in K2 to zero, is required to sum to a value equal to a second arbitrary weighted sum of newly introduced auxiliary variables G(2), minus the sum defined by G'(1): a copy of the weighted sum G(1); a new sub-constraint is created where the weighted sum G(2) is copied to G'(2), another set of variables required to be subject to the original ILP constraint defined over all the variables.

There is further provided according to the invention a method wherein a total N+2 number of clusters can be defined applying recursively the subdivision of the variables as K2 relates to K1, where only the last auxiliary variables G(N+2) are required to be subject to the original ILP constraint of all the variables.

There is further provided according to the invention a method wherein "selecting an ordered sequence of adjacent blocks in the hardware graph collectively mapping a subset of the spins in the selected blocks in 1-to-1 correspondence to the ILP binary variables" comprises identifying families of disjoint, connected subgraphs in the hardware graphs for which a given minor embedding of a specific type of graph with prescribed connectivity properties is known, and for which there is at least one coupling that connects two adjacent blocks in the sequence.

There is further provided according to the invention a method where the specific type of graph with a known embedding is a fully-connected, complete graph.

There is further provided according to the invention a method where the specific type of graph with a known embedding is a fully-connected, complete graph of N variables united with M arbitrarily connected nodes of which a subset could be connected arbitrarily to up to N distinct variables of the complete graph.

There is further provided according to the invention a method where the known embedding is provided from one of a user interacting with the processing device, a memory located in the processing device, a remote processing device operatively connected to the processing device.

There is further provided according to the invention a method wherein the "determining a set of auxiliary spins in each block that are associated to the variables that keep track of the total or partial weighted sum of the one or more constraints in the ILP; further wherein the determined blocks comprises a set of terminals for providing a coupling between the blocks that could be put into 1-to-1 correspondence with the duplicated auxiliary variables in each set of adjacent cluster, two-by-two" comprises the mapping of the variables in the clusters defined in the step "decomposing the ILP into an ordered sequence of clusters representative of the ILP problem" in such a way that the associations are mapping ILP variables of cluster X in the sequence to logical embedded variables in block X in the sequence, using the known embedding and mapping auxiliary variables in the weighted sums G(X) and G'(X) to logical embedded variables in blocks X, X+1 respectively, in such a way that there exist at least a coupling between each variable in G(X) and one variable in G'(X).

There is further provided according to the invention a method wherein the "providing an indication of the how to hard-code the embedded Ising Hamiltonian on the selected block structure" comprises implementing on the Physical Ising Machine the proper physical actions that determine the values of the couplings and local fields after the hard-coding of the embedded Ising Hamiltonian, where the couplings connecting spins that belong to the same logical spins in the known embedding patterns, and the couplings that connect auxiliary variables associated in adjacent clusters, can assume tunable negative values.

There is further provided according to the invention a method wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is provided to a user interacting with the processing device.

There is further provided according to the invention a method wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is stored in a memory located in the processing device and providing the indication of the embedding pattern to a remote processing device operatively connected to the processing device.

There is further provided according to the invention a method wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is directly provided to the Physical Ising Machine.

There is further provided according to the invention a method for solving an ILP problem using a Physical Ising Machine, the method including the steps: generating an embedded Ising Hamiltonian used for solving the ILP problem using the Physical Ising Machine described above; and solving the ILP optimization problem, optimally or approximately, hard-coding the embedded Ising Hamiltonian in the Physical Ising Machine.

BRIEF DESCRIPTION OF THE DRAWINGS

In order that the invention may be readily understood, embodiments of the invention are illustrated by way of example in the accompanying drawings.

FIGS. 1a-1d show two different ways to encode as a QUBO logical graph $\mathcal{L}$ the ILP constraint $\Sigma_{i=1}^{8} x_i \leq 1$. Decomposition of the penalty function $(\Sigma_i x_i)^2$ for $\vec{R}=(2, 2, 2, 2)$ is shown in FIG. 1a while In FIGS. 1c and 1d the ClusterForm decomposition of respectively FIG. 1a and FIG. 1b is shown. Variables are duplicated through embedding (marked circles represent duplicated variables) so that $\mathcal{L}$ could fit the ClusterForm generation rules, which lead to $K(3)^{1K}(5)^{2K}(6)^{2K}(6)$ for (a) and $K(7)^1 K(5)$ for (b). Red dashed lines indicate the interfaces between the clusters.

FIG. 2b shows a logical graph $\mathcal{L}$ associated to the QUBO mapping in Eqs. (15-17). White circles indicate slack variables $y_1$, $y_2$ and $y_3$ and double-lines are associated to constraint (16) as opposed to single lines being generated by (17). Double lines are intended to connect both the white and black nodes of the graph in a complete graph.

Figures 1A, 1B, 1C, 1D:
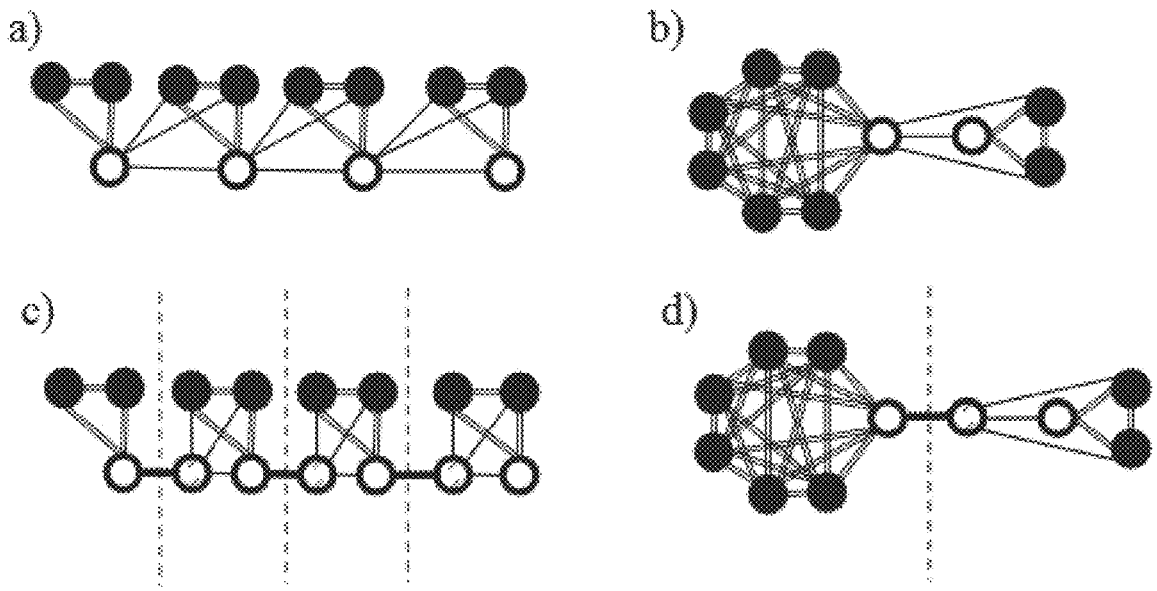

Further details of the invention and its advantages will be apparent from the detailed description included below.

DETAILED DESCRIPTION

In the following description of the embodiments, references to the accompanying drawings are by way of illustration of an example by which the invention may be practiced.

I. Introduction

Instead of trying to identify a ME of $\mathcal{L}$ in $\mathcal{H}$, the ILP can be immediately formulated with a QUBO formula (1) that manifestly guarantees $\mathcal{L} \subset \mathcal{H}$ and then it can be adaptively modified in order to minimize the overhead. Some of the methods presented have been already applied successfully by the same authors of this invention on a specific problem arising in database research, the index selection problem, which was mapped to a variant of the 0-1 Knapsack problem and was compiled to be executed in the D-Wave 2X physical Ising machine hosted at NASA Ames. Here, those techniques are generalized in a unifying framework which can allow the solving of ILPs which can i) run efficiently in time, ii) can exploit pre-processing over $\mathcal{H}$ in order to deal with irregularities, and iii) can be applied with profit to a large variety of hardware, beyond D-Wave's architectures.

For clarity, it is introduced a QUBO representation and a notation of ILP which allows large flexibility over the generation of the logical graph $\mathcal{L}$, setting the ground for the actual ME identification described, with a specific example on the compilation of the problem of single-machine scheduling in the D-Wave Hardware. The presented methods are contextualized in a framework to design embedding systems for a generic hardware and with known computational time and performance scaling.

II. QUBO Transformations and Book-Keeping of Partial Sums

An ILP can always be represented by encoding of integers into binary variables [2] and by converting the in-equality constraints into equality constraints involving slack variables. Without loss of generality, an ILP problem with constraints $$\min\left[\sum_{i=1}^{N} \gamma_i x_i\right]; \sum_{i=1}^{N} \mathbb{A}_i^{[c]} x_i \leq \kappa^{[c]} \ \forall \ c \quad (3)$$

can have each constraint be cast in the form:

$$\left[\sum_{i=1}^{N} \mathbb{A}_i^{[c]} x_i + \sum_{k=1}^{M_c} \mathbb{B}_i^{[c]} y_k^{[c]} - \kappa^{[c]}\right] = 0 \ \forall \ c, \quad (4)$$

where $x_i$ are the problem logical bits, $y_k$ are the auxiliary slack bits. The objective function, the encoding and constraints are encapsulated in the integer vectors $\vec{\gamma}$, $\vec{\kappa}$, and matrices $\mathbb{A}$ and $\mathbb{B}$.

The constraint (4) can be rewritten as a penalty function, to turn the ILP into a QUBO. Any quadratic form that takes positive values when the constraint is not satisfied is a legitimate, and is zero otherwise. The standard choice in the quantum annealing programming literature has typically been to cast Eq. (4) into the Hamiltonian:

$$H = H_{obj} + \sum_c H_{con}^{(c)} \quad (5)$$

$$= \left[\sum_i \gamma_i x_i\right] + \sum_c \left[\sum_i \mathbb{A}_i^{[c]} x_i + \sum_k \mathbb{B}_i^{[c]} y_k^{[c]} - \kappa^{[c]}\right]^2$$

which manifestly generates a logical graph $\mathcal{L}$ that requires intersecting fully-connected graphs of size $\mathcal{O}(N) \pm M_c$, depending on how many elements of $\mathbb{A}$ are nonzero. Without loss of generality, for display clarity, in the following a single constraint will be considered, dropping the superscript [c] in the notation. Moreover, it will be assumed that there are no-slack variables, for two reasons. First, it is clear that $\mathbb{A}$ and $\mathbb{B}$ matrices, and x,y bit vectors, could be lumped together in new matrices $\mathbb{F}$ and vectors z, leading to the simplified form $H_{con} \equiv [\Sigma_{i=1}^{N+M} \mathbb{F}_i z_i - \kappa]^2$ Second, it is possible to start by transforming all inequalities in equalities and then slack variables could be introduced at the end of the decomposition that is described below to enforce the inequality, as it will become clear in the examples. In other words, what is relevant to consider is a constraint representing the requirement that the weighted sum of a N bits (M=0) is equal to $\mathcal{K}$.

In order to introduce the novel techniques for embedding, it is appropriate to introduce a new class of penalty functions that could be used for $H_{con}$. The family parameter is an integer vector of $\vec{R}$ non-zero components, satisfying $\Sigma_n^z R_n = N$ and $R_0 = 0$. $\vec{R}$ represents the split of the sum $\Sigma_i$ into partial sums $\Sigma_n \Sigma_j$, each of $R_n$ bits:

$$H_{con}[\vec{R}] = \sum_{n=1}^{Z} H_{con}^n + H_{con}^\kappa \quad (6)$$

$$= \sum_{n=1}^{Z} \left[ \sum_{j=(R_{n-1}+1)}^{R_n} \mathbb{A}_j x_j - (G_n - G_{n-1}) \right]^2 + \quad (7)$$

$$[(G_Z - \kappa)]^2 \quad (8)$$

where $G_n \in \mathbb{N}$ are additional integer variables which are meant to bookkeep the values of the partial sums, i.e.

$$G_n = \sum_{j=1}^{(\Sigma_l^n R_l)} \mathbb{A}_j x_j; \; G_0 = 0 \quad (9)$$

The terms (7) enforces Eq. (9) for each variable group of size $R_n$, while the last (8) enforces the final equality. This last term (8) could include slack variables if an inequality needs to be enforced. Hence, Eq. (6) is a legitimate representation of the constraint $H_{con}$ for every $\vec{R}$ (and for $\vec{R}=(N)$ the formula is unchanged).

As per the original variables of the ILP, these auxiliary variables can also be expanded in some binary encoding $Gn = \Sigma_t \mathbb{G}_t g_t[n]$ with $g_t^{[n]} \in 0, 1$ and $\mathbb{G}$ a matrix with integer elements, leading to a final QUBO form for the partial sum terms:

$$H_{con}^n = \left[ \sum_{j}^{R_n} \mathbb{A}_j x_j - \left( \sum_t \mathbb{G}_t g_t^{[n]} - \sum_{t'} \mathbb{G}_{t'} g_{t'}^{[n-1]} \right) \right]^2 \quad (10)$$

where the sum over j is implied to be only in the relevant subset of logical bits.

By plugging Eq. (10) into Eq. (6) and looking at the resulting $\mathcal{L}$ generated by the QUBO structure, compared to the logical graph generated by Eq. (5), it is clear that while the number of variables have increased (due to the introduction of ($\mathbb{G}$) a single fully-connected graph of N variables is no longer necessary. Instead, what is required is an ordered sequence of Z complete graphs of size $R_n + \mathcal{O}(\mathcal{K})$, which share $\mathcal{O}(\mathcal{K})$ variables pair-by-pair, from the first to the last pair. These shared variables, whose number can be bounded by $\mathcal{K}$ can be as few as $\log_2 \mathcal{K} / Z$ for each pair, and their actual number depends on the choice of $\vec{R}$ and of the integer-to-bitstring encoding. This choice is ultimately driven by the precision constraints on the parameters that can be programmed in the IM.

In FIGS. 1a and 1b an example of decomposition of the constraint $\Sigma_{i=1}^8 x_i \leq 1$ is discussed. The standard representation would require a complete graph of degree 8, while the two chosen decompositions reduce the degree requirement to 6 or 7, at the expense of adding the new g-variables. It is clear that the described decomposition of the constraint hold the potential to design a logical graph with large flexibility, and this option is the main tool that will be used to constructively design the ME, in Section IV.

III. Clusterform Notation

In order to keep track of, and manipulate, the degree requirements and the variable overhead of $\mathcal{L}$ for different choices of $\vec{R}$, a symbolic notation might come in handy. The purpose of this notation is only to explain the systems and methods in a more compact way.

The symbol K(n,m) could be associated to a cluster, defined as representing a graph structure with n+m vertices. The first argument indicates that n vertices are part of a complete graph (clique variables). The second argument means that m vertices (routing variables) are each connected to a different clique variable (n≥m). An ordered product of multiple clusters could be named a ClusterForm, and will be noted generically as:

$$K(n_1, m_1)^{r_1, s_1} K(n_2, m_2)^{r_2, s_2} \ldots K(n_K, m_K) \quad (11)$$

where the superscripts r and s indicate the connection requirements between different clusters as follows: $r_i(s_i)$ variables among the $n_i(m_i)$ clique (routing) variables, needs to be connected one-by-one to at least one of the $n_{i\pm1}^{(m_{i+1})}$ clique (routing) variables. The formalism implied that the connections could be allowed for each specific choice of pair of variables. For visual clarity, if the number of routing variables/connections is zero, the second argument can be omitted.

In FIGS. 1c and 1d it is shown a ClusterForm decomposition of the example constraint, $\Sigma_{i=1}^8 x_i \leq 1$, where slack variables are not relevant. In order to fit the structure of the connection requirements, the g-variables are duplicated from cluster i to cluster i+1, a procedure common in ME algorithms which amounts into defining a logical variable as two connected vertices of the QUBO graph. In the Ising objective function, this procedure is justified by the introduction of large negative value of the coupling between the two spins, which will penalize discordant values (a procedure known as embedding parameter setting).

Working Example: Single Machine Scheduling

The single machine scheduling problem (SMS or $1|r_i, d_i, p_i|\Sigma_i w_i U_i$ in Graham's 3-fields notation or k-track assignment in some literature) describes the computational challenge of selecting when to execute N tasks, under the constraint that each task has a release date $r_i$, a due date $d_i$ and a processing time $p_i$. No more than a single task can be running at the same time. It can be written as an ILP, in the so called time-indexed formulation, where time is discretized in T time slots:

$$\max \sum_i w_i x_i \quad (12)$$

$$\forall i \sum_{t \in [r_i, d_i]} x_{it} \leq 1 \quad (13)$$

$$\forall i, j \sum_{t \in [r_i, d_i]} \left( x_{it} + \sum_{t'=t}^{t+p_i} x_{jt'} \right) \leq 1 \quad (14)$$

with $w_i \in \mathbb{N}^+$ representing the priority weight of task i and $x_i \in \{0, 1\}$ representing the binary choice of scheduling task i at time $t \in [0, T]$. Eq. (12) represents the objective function that maximizes the total priority of the scheduled tasks. Constraint (13) indicates that a given task is scheduled at most once, and (14) enforces that two tasks cannot be running at the same time.

A QUBO representation of SMS could be straightforwardly obtained following for instance the prescriptions for the penalty functions as in Ref. [21]:

$$H = \min \sum_i w_i x_i \quad (15)$$

$$+ \alpha \sum_i \left( \sum_{t \in [r_i, d_i]} x_{it} \right)^2 \quad (16)$$

$$+ \beta \sum_i \left( \sum_{t \in [r_i, d_i]} \sum_j \sum_{t'=t}^{t+p_i} x_{it} x_{jt'} \right) \quad (17)$$

where the ILP and QUBO formulations can be put in correspondence line-by-line. The constraints (14) have been put in the form (17) instead of the straightforward choice:

$$\beta \sum_{t \in [r_i, d_i]} \sum_i \left( x_{t'} + \sum_{t'=t}^{t+p_i} x_{jt'} + y_{ijt} - 1 \right)^2, \quad (18)$$

since the chosen formulation saves $\approx N(N-1)\langle pi \rangle \langle wi \rangle/2$ auxiliary variables, where with $w_i$ we indicate the execution window width $d_i - r_i$, and $\langle \rangle$ is intended to be the average over the tasks.

For the generation of the ClusterForm, the objective function (15) does not have to be considered since its logical graph does not have any graph degree requirements. Each constraint (16) could be associated following a task-to-cluster assignment, generating the form $\Pi_i K(w_i, 0)$. This ClusterForm indicates that the QUBO requires N complete graphs, one for each task i, of size equal to the execution window width (the slack variable $y_i$ can be avoided when the inequality is ≤1, as shown in Eq. (17)). Once the clusters have been defined, constraint (17) does not add additional variables, but it describes connection requirements between the clusters defined in (16). It is clear that each cluster requires a connection to a variable in one of the other clusters for each quadratic term in the parenthesis, and this number $c_i$ varies from cluster to cluster, although the average number of connections can be estimated to be $\langle c_i \rangle \approx (N-1)\langle pi \rangle \langle wi \rangle^2/T$ per cluster.

In the defined ClusterForm notation it is essential to define an ordering of the clusters, and the notation allows to define connections only between subsequent clusters. Moreover the connections between clusters needs to be 1-to-1. One way to ensure this, while keeping the connectivity requirements, is to add a clique variable to cluster i+1, and a clique connection to i, for each variable in cluster i that has at least one connection to cluster i+1. This is analogous to the variable duplication drawn in FIGS. 1c and 1d to generate the appropriate ClusterForm. The duplication is clearly unnecessary if the variable involved are already only 1 in each cluster, in which case a single clique connection will do. When a connection is required between two clusters which are not in adjacent location in the ordering, routing variables can be used as follows: for each $x_i$ (or y-variable) in cluster i that needs to be linked with the variables $x_{i+k}$, in cluster i+k (with k>1), a routing variable can be added in clusters i, i+1, . . . , i+k and a routing connection can be enforced between clusters i, i+1, . . . , i+k−1. The idea is that the non-local interactions are established by copying the variable in the originating cluster i and carrying it over to the cluster i+k, and then enforcing the same value through embedding parameter-setting.

With an arbitrary ordering, defining periodic boundary conditions on the cluster chain (i≡i+N), the ClusterForm for SMS would read:

$$\prod_i K(w_i, c_i'' + \bar{d}_i)^{c_i', c_k'' + \bar{d}_i} \quad (19)$$

with $c_i'$ indicating the connections between cluster i and i+1 generated by the logical graph $\mathcal{L}$ of Eq. (17) while $c_i''$ are requiring routing (ci=$c_i'$+$c_i''$) With $\bar{d}_i$ is noted the carrying-over of the routed variables from the other N−1 originating nodes: $\bar{d}_i = \Sigma_{j=1-N+1}^{i-1}(c_j - \Sigma_{k=j}^{i-2} c'_k)$.

Figure 2A:
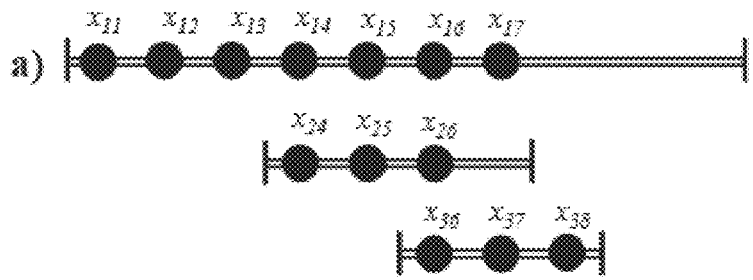
FIG. 2a shows a graphical representation of a scheduling problem instance, with three tasks, in terms of a Gantt chart. Jobs have processing times respectively $p_1=4$, $p_2=2$, $p_3=1$ as indicated by the end of the window that shows the maximum time of occupation of the machine for each task.
Figure 2B:
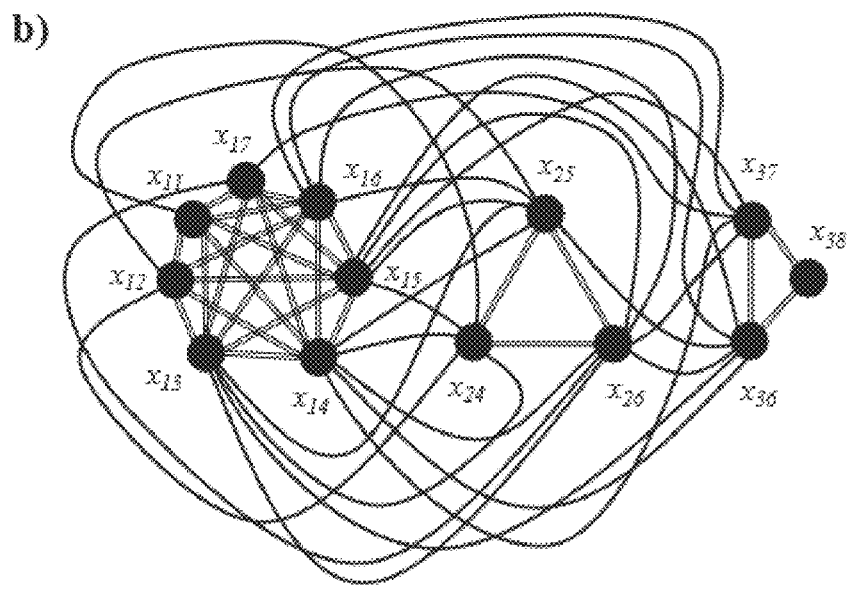
FIG. 2b shows decomposition for $\vec{R}=(6, 2)$. Black circles indicate logical variables, white circles are sums encoding partial sums (g variables), grey circles are slack variables to enforce the inequality.

In FIG. 2a it is depicted a Gantt representation of a simple 3-tasks SMS problem. Considering non-zero priorities, $p_1$=4, $p_2$=2 and $p_3$=1, the solutions to this instance are the ones with the following non-zero bits: ($x_{17}$, $x_{24}$, $x_{37}/x_{38}$), or ($x_{11}$, $x_{25}$, $x_{37}/x_{38}$), or ($x_{11}$, $x_{25}$, $x_{37}/x_{38}$). With reference to this example, the described ILP→QUBO formulation would associate the instance to a 13-bits QUBO (2-b), which could trivially be associated to a K(13) cluster.

Figure 2C:
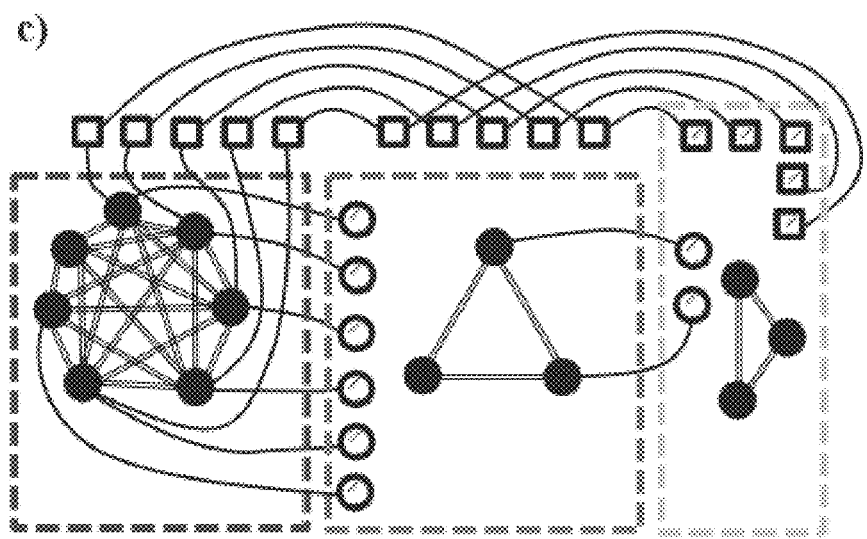
FIG. 2c is a pictorial view of the ClusterForm $K(7,5)^{6,5}K(9,5)^{2,5}K(10)$ which can be associated to the problem (see text).

The task-to-cluster decomposition would instead lead to the ClusterForm depicted in FIG. 2c: K(7,5)6,5K (9,5)2,5K (10). While the number of variables has clearly increased from 13 to 37, the QUBO is now encoded in a logical graph $\mathcal{L}$ which can be parametrized by a different Cluster-Form, and this can be exploited for the identification of a ME.

As it will be clear, it is convenient to have Cluster-Forms with as few variables as possible. For SMS, assigning a cluster to each individual task, requires a substantial number of routing variables. A more natural choice could be to cluster the variables according to their time label, irrespectively of to which task they belong to. Assuming for each task that $x_{it}$ variables are separated in two clusters $A_i$ and $B_i$ respectively associated to time indexes $t \in [r_i, \tau]$ and $t \in [\tau+1, d_i] > T$, the constraint (16) becomes (up to an additive constant):

$$\alpha \sum_i \left[ \left( \sum_{t \in A_i} x_{it} - g_i^{[1]} \right)^2 + \left( \sum_{t \in B_i} x_{it} - g_i^{[2]} + g_i^{[1]} \right)^2 \right] \quad (20)$$

where the decomposition (10) has been applied in such a way that in the logical $\mathcal{L}$ all the variables in A are fully connected, those in B are fully-connected, and only the auxiliary variable $g_i^{[1]}$ is fully connected to both clusters. As customary in the practice of embedding, as discussed before the variable $g_i^{[1]}$ could be duplicated, essentially split in two variables, introducing $g_i^{[1]'}$. The equality between the two is enforced by the introduction of the penalty functions $\rho(g_i^{[1]} - g_i^{[1]'})^2$ with $\rho \gg 1$. For each task, the constraint (20) then reads:

$$\alpha \sum_i \left[ \left( \sum_{t \in A_i} x_{it} - g_i^{[1]} \right)^2 + \left( \sum_{t \in B_i} x_{it} - g_i^{[2]} + g_i^{[1]'} \right)^2 + g_i^{[1]} + g_i^{[1]'} - 2g_i^{[1]} g_i^{[1]'} \right] \quad (21)$$

which makes it explicit that the underlying $\mathcal{L}$ for this QUBO now, for every i, supports the ClusterForm $K(|A_i|+$ 1)[1]$K(|B_i|+2)$. The whole constraint (20) could then be associated to the ClusterForm $$K(A+N_\tau)^{N_\tau}K(B+2N_\tau) \qquad (22)$$

where $Z=\Sigma_i|A_i|$ and $B=\Sigma_i|B_i|$ and $N_\tau$ represents the number of tasks that are cut by the boundary $t=\tau$. As discussed before, the edges in (17) which are entirely within the clusters A or B are already represented in the decomposition (22) so what it is needed is to quantify the edges which are connecting the two clusters, which are added in the ClusterForm as clique connections (no routing variables/connections are needed this time, due to the presence of only two clusters).

Figure 2D:
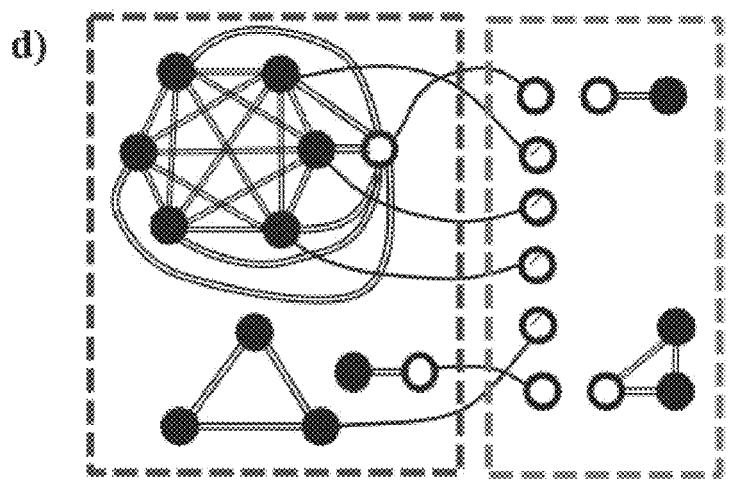
FIG. 2d is similar to FIG. 2c but for the ClusterForm $K(12)^6K(11)$ (see text). The dashed boxes in FIGS. 2c and 2d represent complete graphs (clique variables) while the squares arc the routing variables.

The end result of applying this decomposition assigning $A_i=[r_i, 5]$ and $B_i=[6,d_i]$ is depicted in FIG. 2d where it is clear that the final ClusterForm that could represent the whole QUBO is now $K(12)^6K(11)$, which essentially means that the instance can be compiled into two fully connected clusters of 12, 11 variables, with 6 variables in each clusters having 1-to-1 connections.

Other choices for the mapping to QUBO, and for the definition of the clusters are obviously possible, leading to different ClusterForms with different properties.

IV. Embedding in the Ising Machine Hardware Layout

In this section, through a worked out example, it is described the essential principle of how the physical system that will hard-code the ClusterForm in the hardware chip has to operate. The advantage of working with the ClusterForm formalism is to keep explicitly track of the structure of the logical graph $\mathcal{L}$ so that this abstract representation could facilitate embedding. This is possible since not only the ILP, but also the IM hardware graph $\mathcal{H}$, can be associated to a family of ClusterForms, so that the embedding condition $\mathcal{L} \subset \mathcal{H}$ could become manifest at the ClusterForm level. Indeed, if a cluster i (belonging to a ClusterForm associated to $\mathcal{L}$) is to be embedded into a cluster i' (in a ClusterForm associated to $\mathcal{H}$), i.e.

$$K(n_i,m_i)^{r_i,s_i} \subset K(\overline{n_i},\overline{m_i})^{\overline{r_i},\overline{s_i}},$$

then the required condition is that the barred values needs to be at least as large as the non-barred values, $\bigstar \geq \bigstar$, for each variable and connection counters $n_i$, $m_i$, $r_i$ and $s_i$. This means that for each vertex of $\mathcal{L}$ it is easy to identify a vertex in $\mathcal{H}$ which satisfies the same degree and connection requirements, so the identification of the embedded subgraph is straightforward.

Two ClusterForms with the same number of clusters can be compared cluster-by-cluster to see if the relationship is satisfied, while if the number of clusters are different, it is possible to resort to fusion rules between clusters to transform a ClusterForm into another with a reduced number of clusters:

$$K(n_1,m_1)^{r_1,s_1}K(n_2,m_2)^{r_2,s_2} \equiv K(n_1+n_2,\max[m_1,m_2])^{r_2,s_2}.$$

Eq. (23) is essentially stating that two connected graphs could be always embedded as subgraph into a complete graph with sufficient number of vertices, while keeping the connection and routing requirements with respect to adjacent clusters. However this ClusterForm fusion is typically inefficient with respect to the ab-initio creation of a ClusterForm with a single cluster, due to the fact that some of the new $n_1+n_2$ clique variables are redundant. For instance the difference between $K(4)^2K(6)^2K(6)$ in FIG. 1c and $K(8)$ in FIG. 1d is an example on how three clusters can be joined efficiently into a single one, eliminating redundant variables by edge contraction.

Working Example: SMS on the Chimera Graph

As mentioned, similarly as in the ILP→QUBO→ClusterForm generation described in sections II-III, some rules can be identified for specific hardware topologies $\mathcal{H}$ to generate a ClusterForm. To show this, in this subsection, it is assumed that $\mathcal{H}$ is a Chimera graph (implemented by the physical Ising machines of D-Wave systems Two™, 2X™ and 2000Q™) but a similar procedures and considerations as the ones presented can be implemented for other other topologies, as discussed in the next section.

Figures 3A, 3B:
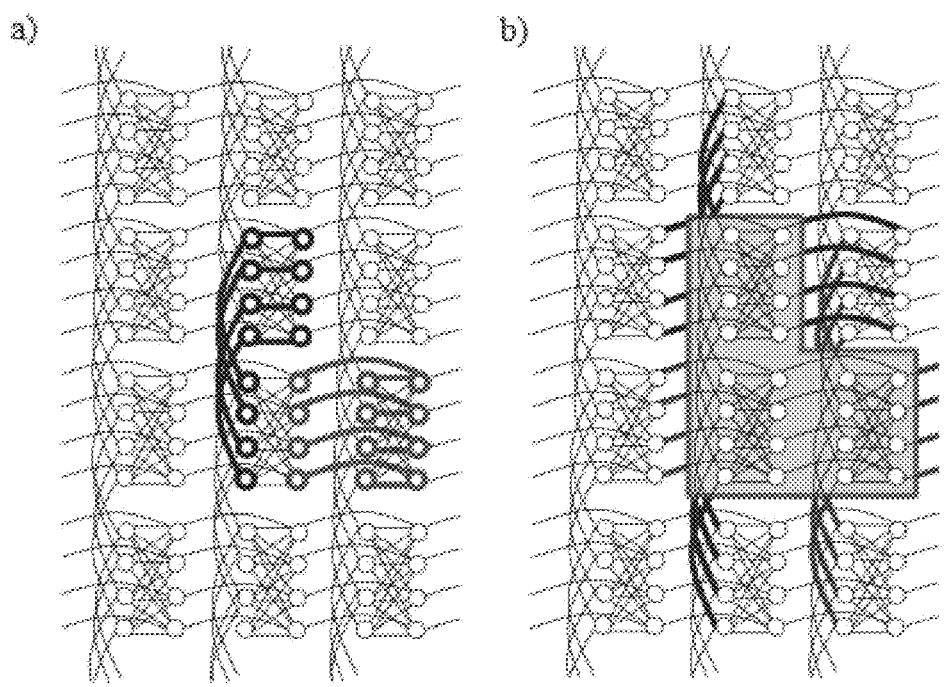
FIG. 3a shows a complete graph with 8 nodes is embedded in a chimera chip with 3×4 unit cells [18]. Each bold line indicates a logical spin (composed by 3 Ising spins in the example).
FIG. 3b shows the complete graph embedded in FIG. 3a highlighted as a triangle composed by unit cells of the chip. The colors make it clear that an expansion of the triangular pattern on a new row, adds 4 more logical variables, each composed by n/4+1 physical spins on the hardware. The couplings that are available for inbound, outbound and routing connections arc highlighted adjacently the red shape.

The Chimera graph is a graph where fully bipartite $\mathcal{K}_{4,4}$ unit cells are disposed on a rectangle grid, with planar inter-cell connections that maintain the bipartite character of the whole graph. A chimera layout is pictorialized in FIGS. 3a and 3b. With reference to the known minor embedding techniques for complete graphs on Chimera [16, 18, 20], it is clear that a cluster of the form $K(n_i)^{r_i}$ could be embedded into a triangular arrangement of unit cells encompassing $n_i\times(n_i/4+1)$ vertices of $\mathcal{H}$, where the connections could be implemented in either of the three sides of the triangles (see FIG. 3a). The sides of the triangular patterns could indeed be each associated as interfaces for the connections inbound (e.g. clique connections incoming from the preceding cluster), outbound (e.g. the clique connections noted as superscripts) and routing. Once the associations are made, the triangular patterns can be placed on specific grid sites covering adjacent regions of the layout of the chip, as in FIG. 3b. Routing variables are independent, so they do not require triangular patterns, but they require to be interfaced to the routing variables of the previous and next cluster. They can be straightforwardly embedded in rectangular regions of the chip grid, so that a cluster $K(n_i, m_i^-)^{r_i,s_i}$ could be represented by $n_i\times(n_i/4+1)/8$ unit cells in triangle arrangement, attached to a $(n_i/4+1)/2\times m_i/4$ rectangular base of cells in the worst case scenario. See FIG. 3c for the visualization of the associations of the cluster $K(9,5)^{2,5}$, sandwiched in the chain of the ClusterForm $K(7,5)^{6,5}K(9,5)^{2,5}K(11)$, which is associated to the QUBO presented in FIG. 2c.

Figures 3C, 3D:
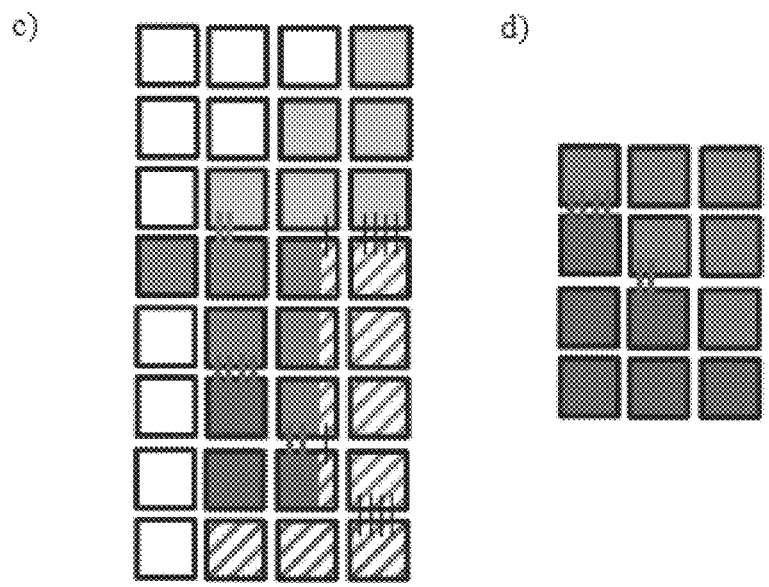
FIG. 3c shows a high-level view of the embedding of the ClusterForm $K(7,5)^{6,5}K(9,5)^{2,5}K(11)$ in a 4×8 cells chimera chip (see FIG. 2c for color correspondence of each cluster). Clique variables are embedded in filled cells, Routing variables are in cells with patterned fill. Clique connections between cells arc represented as thick colored segments, routing connections with black segments.
FIG. 3d shows a compact embedding of the $K(12)^6K(11)$ ClusterForm.
Figure 4:
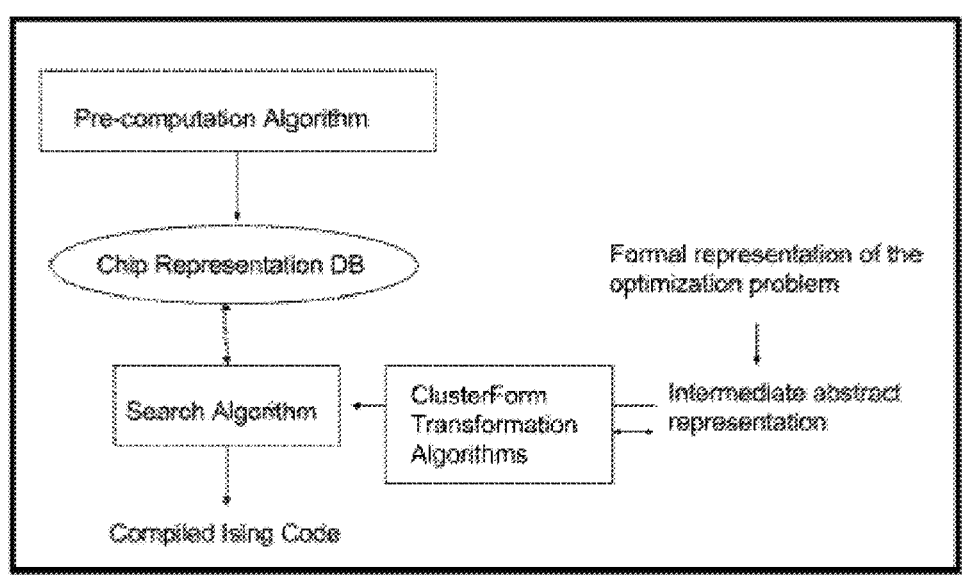
FIG. 4 shows an implementation of one embodiment of the invention.
Figure 5:
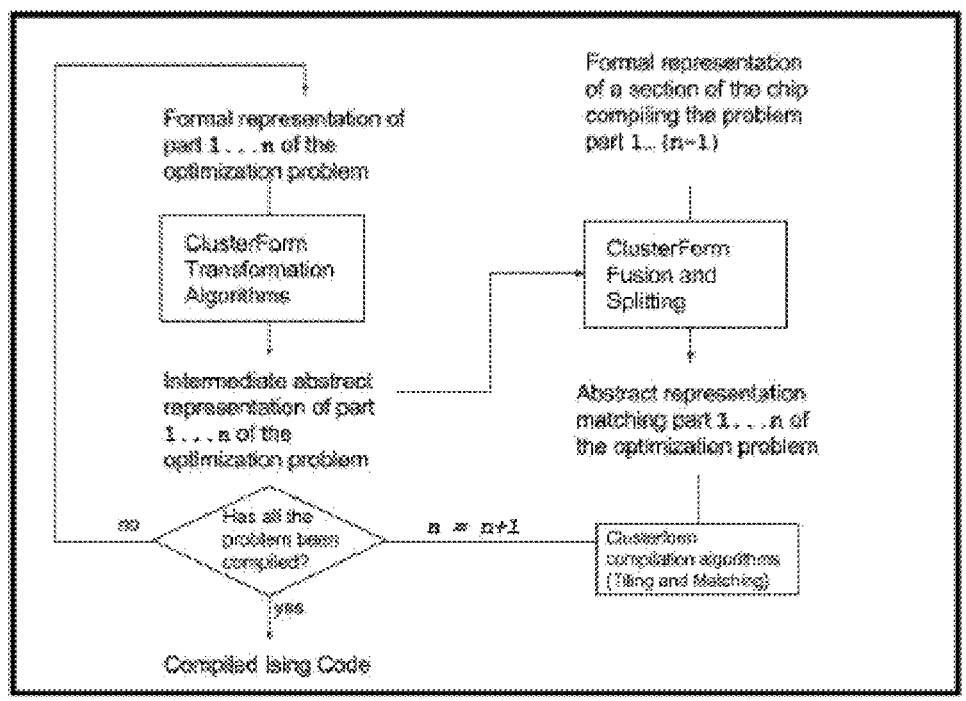
FIG. 5 shows an implementation of another embodiment of the invention.

As it is clear from the example, the placement of multiple clusters within a constrained layout might be tricky, and a specific prescription, a tiling algorithm, should be defined to complete the compilation strategy. For instance, a strategy for inbound-outbound connection matching could be to pair clusters two-by-two (2-clusters) in such a way that they form a rectangle where clique connections are implemented in the hypoteneuses while routing variables are placed along two adjacent sides of the composed rectangle. This algorithm, requires a region of maximum $n/4\times(n/4+1)$ cells with $n=\max[n_1, n_2]$ to tile the 2-cluster $K(n_1)^{r_1}K(n_2)^{r_2}$, as shown in the examples of FIGS. 3c and 3d. 2-clusters need also to be arranged in a chain to compile the ClusterForm, but now the problem of matching the connections of rectangles is significantly easier than matching the connections on the side of triangles. For each 2-cluster, if routing variables are present, there is only one specific side of the rectangular regions that could support inbound and outbound connections, so it is clear where the next 2-cluster needs to be placed on the chip. The interface constraints clearly may lead 2-clusters to be placed into a region of the chip where it is impossible to not to overlap another placed cluster. This could be avoided by the introduction of additional interface-routing variables that deterministically route the interfaces into a region of the chip where the cluster can be placed, ultimately compiling the ClusterForm into a divergent spiral of chained 2-clusters. It is also easy to note that the Chimera graph favors complete graph embeddings whose number of variables is multiple of 4. The triangular pattern allows the conversion of n mod 4 routing variables into clique variables without wasting more unit-cell space, i.e. $K(n,m)^{r,s} \equiv K(n+n \mod 4, m-n \mod 4)^{r,s}$ as shown for instance in FIG. 3d.

Of course, should the overlap become impossible within the chip space allowance, then the embedding algorithm, for the given ClusterForm, fails.

It is clear that different strategies could lead to more efficient embeddings, i.e. to more compact assignments which do not waste cell-spaces in the grid and do not require as many interface-routing variables. Generally speaking, the described ClusterForm tiling problem can be itself formulated as an ILP.

V. A Framework for Deterministic Generation and Hard-Coding of Embedded Ising Hamiltonians In sections the essential concepts of a novel approach to embedding ILPs in IMs have been presented, using as a working example the SMS problem. In this section we wrap the proof of concepts and the examples in a structured framework, described from the top down, that can be used to systematically design different embedding procedures for generic ILPs in generic hardware. This framework is the basis for a family of novel system, that will have to be present in the IM, to hard-code ILP in the computer chip, and fully specifies the characteristics of the possible embodiments.

In the previous sections, the following methods were discussed:

(I2Q) ILP to QUBO: the mapping of the ILP constraints into penalty functions and the definition of a problem Hamiltonian such as Eq. 5. This can include specific choices of how to encode integers with binary variables and the introduction or not of slack variables (e.g. the decision to map constraint (14) as (17) or (18)). This can include the parametrization of families of QUBOs based on the book-keeping of the partial sums described in section II. The output of I2Q is a logical graph $\mathcal{L}$ (or an ensemble of logical graphs).

(CF-G) ClusterForm generation: the choices to define the cluster specifications based on the QUBO, as well as the rules for the computation of the specified kind of variables and the pattern of possible connections. In Eq. (11) the introduced symbolic representation was defining clique, routing variables and associated connections based on the choice made. The rules define the level of abstraction for the representation of $\mathcal{L}$ for further processing; for instance fully-bipartite graphs could be chosen as the basic clusters, instead of complete graphs, or different kind of clusters could be authorized. Moreover the topology of the Cluster-Form needs to be defined (e.g. ring topology such as in (19) or open-ended chain. Also 2D or n-dimensional topologies could be used, of course). The assignment of clusters could lead to the necessity to apply further QUBO transformations and duplication of variables such as the ones leading to Eq. (21) from Eq. (16). The output of CF-G is a ClusterForm (or an ensemble of ClusterForms).

(CF-T) ClusterForm transformation: methods to transform a ClusterForm into another guaranteeing that the new form can still represent the $\mathcal{L}$ which was associated to the previous form. These algorithms include fusion of clusters such as in Eq. (23) or rules to transform variables of one kind into another, such as the free conversion of routing to clique variables exemplified in FIG. 3c, outputting another ClusterForm.

(T &M) Tiling and Matching: These are the procedures to place the ClusterForm on the hardware chip. This includes rules to represent individual clusters on the chip and rules to assemble on the chip a ClusterForm. One way to see this is as a matching of the ClusterForm obtained for G with one of the possible ClusterForms which are known to be embeddable on the chip. For instance, considering a Chimera graph with n×m, unit cells, an embedding could be found placing cluster-by-cluster the ClusterForm on the chip with trial and error methods. A deterministic T&M method is the one described in Section IV employing the triangular complete graph embedding for each individual cluster, and the 2-cluster method for the inbound-outbound connection matching. The resulting output should be close to a valid embedding with the caveat that the routing variables should be matched as well.

(IR) Interface Routing: place-and-route prescriptions on how to place the routing connections. These methods could exploit conversions between different kind of variables such as the opportunity to utilize empty space in unit cells that are used to represent clusters. The output of IR is a valid embedding of the problem.

The system object of this invention is a component of the control circuitry of the IM which is capable to execute these described methods in a flexible way, resulting in hard coding the required $J_{ij}$ and $h_i$ parameters in a physical representation on the hardware chip. This physical representation might consist in using the described methods for setting electric or magnetic fields, tuning laser powers, activate electromechanical systems, applying signals in order to generate the correct energy landscape, according to the specific architecture of the IM. Moreover, this system needs to be able to interact with a memory and be controlled by a conventional digital computer in order to guarantee the application of the methods.

Indeed these logically independent procedures could be either assembled sequentially to generate the embedding or be very well intertwined and encapsulated in control loops or search algorithms, and complemented by pre- and post-processing algorithms, that will control and inform the operation of these units. For instance, one implementation of an embedding could heuristically generate multiple Cluster-Forms through a combination of I2Q and CF-G and CF-T procedures, and try to find a matching of one of these ClusterForms with one that could include it among those indexed in a large database. The database could be the result of a pre-computation for a specific hardware chip, where the pre-computation made use of many T&M prescriptions to find valid embeddable clusterforms. Exploiting pre-processing methods could indeed be very important if the chip topology is irregular due to the presence of faulty unusable spins.

Although the above description relates to a specific preferred embodiment as presently contemplated by the inventor, it will be understood that the invention in its broad aspect includes functional equivalents of the elements described herein.

REFERENCES

1. Johnson, Mark W., et al. "Quantum annealing with manufactured spins." Nature 473.7346 (2011): 194-198.
2. Rosenberg, Gili, et al. "Solving the optimal trading trajectory problem using a quantum annealer." IEEE Journal of Selected Topics in Signal Processing 10.6 (2016): 1053-1060.

3. Zaribafiyan, Arman, Dominic J J Marchand, and Seyed Saced Changiz Rezaci. "Systematic and deterministic graph-minor embedding for cartesian products of graphs." arXiv preprint arXiv:1602.04274 (2016).
4. McMahon, Peter L., et al. "A fully-programmable 100-spin coherent Ising machine with all-to-all connections." Science (2016): aah5178.
5. Inagaki, Takahiro, et al. "A coherent Ising machine for 2000-node optimization problems." Science 354.6312 (2016): 603-606.
6. Lochner, Wolfgang, Philipp Hauke, and Peter Zoller. "A quantum annealing architecture with all-to-all connectivity from local interactions." Science advances 1.9 (2015): 01500838.
7. Glaetzle, Alexander W., et al. "A Coherent Quantum Annealer with Rydberg Atoms." arXiv preprint arXiv: 1611.02594 (2016).
8. Fujitsu Press Release, Fujitsu Laboratories Develops New Architecture that Rivals Quantum Computers in Utility. URL: http://www.fujitsu.com/global/about/resources/news/press-releases/2016/1020-02.html
9. IEEE Spectrum, HPE's New Chip Marks a Milestone in Optical Computing. URL: http://spectrum.icee.org/semiconductors/processors/hpes-new-chip-marks-a-milestone-in-optical-computing
10. M. Yamaoka, et al. "A 20 k-Spin Ising Chip to Solve Combinatorial Optimization Problems With CMOS Annealing." IEEE Journal of Solid-State Circuits 51.1 (2016).
11. Quantum Enhanced Optimization (QEO) IARPA research program https://www.iarpa.gov/index.php/research-programs/qco/qco-baa
12. Adiabatic Quantum Computing Conference 2016—Yu Chen's invited talk https://youtu.be/QfTkf3SqyFo
13. Hamilton, Kathleen E., and Travis S. Humble. "Identifying the minor set cover of dense connected bipartite graphs via random matching edge sets." arXiv preprint arXiv:1612.07366 (2016).
14. Venturelli, Davide, et al. "Quantum optimization of fully connected spin glasses." Physical Review X 5.3 (2015): 031040.
15. Than, Zhengbing, et al. "Discrete optimization using quantum annealing on sparse Ising models." Frontiers in Physics 2 (2014): 56.
16. Boothby, Tomas, Andrew D. King, and Aidan Roy. "Fast clique minor generation in Chimera qubit connectivity graphs." Quantum Information Processing 15.1 (2016): 495-508.
17. Trummer, Immanuel, and Christoph Koch. "Multiple query optimization on the D-Wave 2X adiabatic quantum computer." Proceedings of the VLDB Endowment 9.9 (2016): 648-659.
18. Venturelli, Davide, Dominic J J Marchand, and Galo Rojo. "Quantum annealing implementation of job-shop scheduling." arXiv preprint arXiv:1506.08479 (2015).
19. Kaminsky, William M., and Seth Lloyd. "Scalable architecture for adiabatic quantum computing of NP-hard problems." Quantum computing and quantum bits in mesoscopic systems. Springer US, 2004. 229-236.
20. Choi, Vicky. "Minor-embedding in adiabatic quantum computation: II. Minor-universal graph design." Quantum Information Processing 10.3 (2011): 343-353.
21. Venturelli, Davide, Dominic J J Marchand, and Galo Rojo. "Quantum annealing implementation of job-shop scheduling." arXiv preprint arXiv:1506.08479 (2015).

The invention claimed is:

1. A method for generating an embedding pattern used for solving an Integer Linear Programming problem using a Physical Ising Machine characterized by an hardware graph architecture comprising a plurality of blocks, each block comprising a plurality of spins, the method comprising: use of a processing device for: obtaining an indication of an ILP problem to solve using the Physical Ising Machine; wherein the ILP problem is defined using an integer encoding to binary variables, with a linear objective function and a set of inequality or equality constraints; decomposing the ILP into an ordered sequence of clusters representative of the ILP problem; selecting an ordered sequence of adjacent blocks in the hardware graph collectively mapping a subset of the spins in the selected blocks in 1-to-1 correspondence to the ILP binary variables; determining a set of auxiliary spins in each block that are associated to the variables that keep track of the total or partial weighted sum of the one or more constraints in the ILP; further wherein the determined blocks comprises a set of terminals for providing a coupling between the blocks that could be put into 1-to-1 correspondence with the duplicated auxiliary variables in each set of adjacent cluster, two-by-two; and providing an indication of the how to hard-code the embedded Ising Hamiltonian on the selected block structure;

wherein the "decomposing of the ILP problem into an ordered sequence of clusters representative of the ILP problem" comprises determining a first cluster K1 and a second cluster K2 such that the variables in each ILP inequality or equality constraints are associated either to K1 or K2, and for each ILP constraint: a new sub-constraint is created where the weighted sum of variables obtained by changing the original constraint formulation by setting all the variables not in K1 to zero, is required to sum to a value equal to an arbitrary weighted sum of newly introduced auxiliary variables, G(1); a new sub-constraint is created where the weighted sum of variables obtained by changing the original constraint formulation by setting all the variables not in K2 to zero, is required to sum to a value equal to a second arbitrary weighted sum of newly introduced auxiliary variables G(2), minus the sum defined by G'(1): a copy of the weighted sum G(1); a new sub-constraint is created where the weighted sum G(2) is copied to G'(2), another set of variables required to be subject to the original ILP constraint defined over all the variables.

2. The method as claimed in claim 1, wherein the indication of an ILP problem is obtained from one of a user interacting with the processing device, a memory located in the processing device and a remote processing device operatively connected to the processing device.

3. The method as claimed in claim 1, wherein a total N+2 number of clusters can be defined applying recursively the subdivision of the variables as K2 relates to K1, where only the last auxiliary variables G(N+2) are required to be subject to the original ILP constraint of all the variables.

4. The method as claimed in claim 1, wherein "selecting an ordered sequence of adjacent blocks in the hardware graph collectively mapping a subset of the spins in the selected blocks in 1-to-1 correspondence to the ILP binary variables" comprises identifying families of disjoint, connected subgraphs in the hardware graphs for which a given minor embedding of a specific type of graph with prescribed connectivity properties is known, and for which there is at least one coupling that connects two adjacent blocks in the sequence.

5. The method as claimed in claim 4, where the specific type of graph with a known embedding is a fully-connected, complete graph.

6. The method as claimed in claim 4, where the specific type of graph with a known embedding is a fully-connected, complete graph of N variables united with M arbitrarily connected nodes of which a subset could be connected arbitrarily to up to N distinct variables of the complete graph.

7. The method as claimed in claim 6, where the known embedding is provided from one of a user interacting with the processing device, a memory located in the processing device, a remote processing device operatively connected to the processing device.

8. The method as claimed in claim 4, wherein the "determining a set of auxiliary spins in each block that are associated to the variables that keep track of the total or partial weighted sum of the one or more constraints in the ILP; further wherein the determined blocks comprises a set of terminals for providing a coupling between the blocks that could be put into 1-to-1 correspondence with the duplicated auxiliary variables in each set of adjacent cluster, two-by-two" comprises the mapping of the variables in the clusters defined in the step "decomposing the ILP into an ordered sequence of clusters representative of the ILP problem" in such a way that the associations are mapping ILP variables of cluster X in the sequence to logical embedded variables in block X in the sequence, using said known embedding, and mapping auxiliary variables in the weighted sums G(X) and G'(X) to logical embedded variables in blocks X, X+1 respectively, in such a way that there exist at least a coupling between each variable in G(X) and one variable in G'(X).

9. The method as claimed in claim 8, wherein the "providing an indication of the how to hard-code the embedded Ising Hamiltonian on the selected block structure" comprises implementing on the Physical Ising Machine the proper physical actions that determine the values of the couplings and local fields after the hard-coding of the embedded Ising Hamiltonian, where the couplings connecting spins that belong to the same logical spins in said known embedding patterns, and said couplings that connect auxiliary variables associated in adjacent clusters can assume tunable negative values.

10. The method as claimed in claim 1, wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is provided to a user interacting with the processing device.

11. The method as claimed in claim 1, wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is stored in a memory located in the processing device and providing the indication of the embedding pattern to a remote processing device operatively connected to the processing device.

12. The method as claimed in claim 1, wherein at least one of: the decomposing of the ILP problem into an ordered sequence of clusters, the selection of an ordered sequence of adjacent blocks in the hardware graph collectively mapping a subset of the spins in the selected blocks in 1-to-1 correspondence to the ILP binary variables; the determination of a set of auxiliary spins in each block that are associated to the variables that keep track of the total or partial weighted sum of the one or more constraints in the ILP; the indication of the how to hard-code the embedded Ising Hamiltonian on the selected block structure is directly provided to the Physical Ising Machine.

13. A method for solving an ILP problem using a Physical Ising Machine, the method comprising: generating an embedded Ising Hamiltonian used for solving the ILP problem using the Physical Ising Machine according to the method of claim 1; and solving the ILP optimization problem, optimally or approximately, hard-coding the embedded Ising Hamiltonian in the Physical Ising Machine.

* * * * *